(12) United States Patent
Kennedy et al.

(10) Patent No.: US 8,726,359 B2
(45) Date of Patent: May 13, 2014

(54) METHOD AND SYSTEM FOR CONTENT DISTRIBUTION MANAGEMENT

(75) Inventors: Sean Kennedy, San Diego, CA (US); Gary Lyons, San Diego, CA (US); Edward Winter, San Diego, CA (US)

(73) Assignee: Sony Corporation, Tokyo (JP)

( * ) Notice: Subject to any disclaimer, the term of this patent is extended or adjusted under 35 U.S.C. 154(b) by 66 days.

(21) Appl. No.: 13/273,397

(22) Filed: Oct. 14, 2011

(65) Prior Publication Data

US 2013/0097685 A1 Apr. 18, 2013

(51) Int. Cl.
    *H04L 29/00* (2006.01)
(52) U.S. Cl.
    USPC .............................. 726/8; 726/2; 726/3; 726/5
(58) Field of Classification Search
    None
    See application file for complete search history.

(56) References Cited

U.S. PATENT DOCUMENTS

| 8,296,784 | B1 * | 10/2012 | Brown et al. | 719/328 |
| 2002/0002513 | A1 | 1/2002 | Chiasson | |
| 2006/0004767 | A1 | 1/2006 | Diaconu et al. | |
| 2006/0015614 | A1 | 1/2006 | Johnson et al. | |
| 2007/0180449 | A1 | 8/2007 | Croft et al. | |
| 2008/0256233 | A1 * | 10/2008 | Hall et al. | 709/224 |
| 2009/0049318 | A1 | 2/2009 | Bose et al. | |
| 2009/0292814 | A1 * | 11/2009 | Ting et al. | 709/229 |
| 2010/0174924 | A1 | 7/2010 | Banga et al. | |
| 2010/0287033 | A1 * | 11/2010 | Mathur | 705/10 |
| 2011/0239282 | A1 * | 9/2011 | Svarfvar et al. | 726/5 |
| 2012/0210377 | A1 * | 8/2012 | Wong et al. | 725/109 |
| 2012/0227087 | A1 * | 9/2012 | Brown et al. | 726/3 |

* cited by examiner

*Primary Examiner* — Ghazal Shehni
(74) *Attorney, Agent, or Firm* — Frommer Lawrence & Haug LLP; William S. Frommer; Paul A. Levy

(57) ABSTRACT

A method of managing content related to a plurality of social networking websites. The method comprises accessing a first account that stores user's authentication information of the plurality of the networking websites and connecting to the plurality of social networking websites. Content associated with a second account is obtained from each of the plurality of social networking websites and service capabilities of each of the plurality of social networking websites are tracked. The obtained content from all the social networking websites is displayed on a single page and service information applicable to content is provided.

19 Claims, 12 Drawing Sheets

_500_

| Persistent Database 502 | | |
|---|---|---|
| Content Item 1 504(a) | Metadata 1 506(a) | Distribution History Date and Contact 510(a) |
| Content Item 2 504(b) | Metadata 2 506(b) | Distribution History Date and Contact 510(b) |
| Content Item 3 504(c) | Metadata 3 506(c) | Distribution History Date and Contact 510(c) |
| Content Item 4 504(d) | Metadata 4 506(d) | Distribution History Date and Contact 510(d) |
| Etc. 504(e) | Etc. 506(e) | Etc. 510(e) |

The Persistent Database is essentially a list of all the Content the User has distributed with the Content metadata and distribution history.

Metadata is defined as containing at least the following data: Tags, Labels, Categories, etc. Distribution History Date and Contact: Includes the Distribution Method, the date, and the contacts sent to.

FIG. 5

METHOD AND SYSTEM FOR CONTENT DISTRIBUTION MANAGEMENT

BACKGROUND

1. Field of the Invention

This invention relates generally to a method and system for content distribution management.

2. Background Discussion

Social networking websites have played an increasingly important role in a person's social life. A current social norm is typically represented by a person communicating with others via the internet and social networking sites.

A plurality of social networking sites have been established for providing online social networking services. Examples of these social networking sites include, for example, Classmates.com®, Facebook®, Flickr®, HR.com®, LinkedIn®, LiveJournal®. MyLife®, Twitter®, and YouTube®. In a traditional way, a participant of these social networking websites needs to log onto each site in order to use the social networking services. When a user participates in multiple social networking sites, it is very inconvenient for a user to check each social networking website. Also, conventionally, a user is not able to share content among multiple social networking websites without logging on to each social network site.

SUMMARY

The present invention is directed to a method and system that assists a user to manage and distribute content among multiple data sources. The method and system have an evolving database that includes network node information. The method and system have a persistent database that includes distribution information and metadata for each content.

According to an embodiment of the present invention, the method and system aggregates content from a plurality of sources and presents the aggregated content to a user. The method and system selects a plurality of options to distribute content based on content type, metadata, and a site which the content is distributed to.

According to another embodiment of the present invention, the method and system keep track of capabilities of each social networking website that a user has interest in, and also keep track of incoming posts and messages of each social networking website that the user has interest in. The method can filter each content item, provide service options according to content type, and allow for shared distribution among multiple social networking websites.

According to another embodiment of the present invention, a graphical user interface (GUI) is provided to allow sharing and intelligent translation of online content and information to other online services based on content type. The GUT may be installed on a local personal computer and allow a user to connect with multiple data sources by using a single user interface.

Another embodiment of the present invention is directed to a method of managing content related to a plurality of social networking websites ("the method"). The method includes accessing a first account that stores user's authentication information of the plurality of the networking websites and connecting to the plurality of social networking websites using the authentication information of the plurality of social networking websites. The method obtains content associated with a second account, as identified by the authentication information, from each of the plurality of social networking websites, and tracks service capabilities of each of the plurality of social networking websites. The obtained content from all the social networking websites is displayed on a single page and service information applicable to content according to a type of the content and the service capabilities of each of the plurality of social networking websites is provided.

Another embodiment of the present invention is directed to the method described above, wherein the first account stores authentication information of a multimedia server. The method also includes: obtaining content from the multimedia server; and displaying the content from the multimedia server with the content from all the social networking websites on a single page.

Another embodiment of the present invention is directed to the method described above that further includes aggregating the obtained content from all the social networking websites and storing the aggregated contents in a web storage medium, such as an electronic storage medium accessible by a device operatively coupled to the web.

Another embodiment of the present invention is directed to the method described above and further includes accessing contents stored in a predetermined folder of a local computer and synchronizing the contents stored in the predetermined folder of a local computer. The contents are stored in the web storage medium.

According to another embodiment, the method further includes sharing content among the plurality of social networking websites.

According to another embodiment, the method further includes obtaining updates of content from the plurality of social networking websites and collectively displaying the updates on the same page that displays the content obtained from the plurality of social networking websites.

According to another embodiment of the present invention, the method further includes distributing the content to a plurality of devices associated with a plurality of contacts aggregated from the obtained content.

According to another embodiment of the present invention, the method further includes identifying additional content and determining parameters of the additional content. The displaying step displays the additional content as a function of the parameters of the additional content.

According to another embodiment of the present invention, the method further includes establishing filtering parameters associated with the service capabilities of each of the plurality of social networking websites and filtering the content using the filtering parameters.

According to another embodiment of the present invention, the method further includes establishing one or more tags based on predetermined criteria and applying one or more tags to the content. The content is filtered based on the tags and the filtered content is distributed to one or more destinations.

According to another embodiment of the present invention, the method further includes identifying format parameters with a destination website and formatting the content based on the format parameters. The formatted content is then transmitted to the destination website.

According to another embodiment of the present invention, the content is selected from the group consisting of: audio data; video data; photographic data; or image data or a combination thereof.

According to another embodiment of the present invention, the method further includes applying one or more facial recognition techniques to the content; and tagging the content based on the application of the one or more facial recognition techniques.

According to another embodiment of the present invention, the method further includes identifying content specific information related to particular content and accumulating the content specific information. The content is sorted based on the accumulated content specific information.

According to another embodiment of the present invention, the method further includes establishing one or more categories based on predetermined criteria; and associating particular content with one or more categories; and displaying categories of content.

According to another embodiment of the present invention, the method further includes associating one or more labels with the content and selecting content having a particular label. The selected content is distributed based on the particular label.

According to another embodiment of the present invention, the method further includes establishing a desired format for a recipient to receive the content and providing content to the recipient in the desired format.

According to another embodiment of the present invention, the method further includes establishing one or more first tags based on predetermined criteria and applying the first tags to the content. The content is filtered based on the first tags. Next one or more second tags are established based on additional criteria and the content is re-tagged based on the second tags. The content is then filtered based on the second tags and distributed to one or more destinations.

According to another embodiment of the present invention, the method further includes changing either one or more of the first tags or one or more of the second tags associated with the content and then filtering the content based on the changed tags.

Other embodiments of the present invention include the methods described above but implemented using apparatus or programmed as computer code to be executed by one or more processors operating in conjunction with one or more electronic storage media.

BRIEF DESCRIPTION OF THE DRAWINGS

To the accomplishment of the foregoing and related ends, certain illustrative embodiments of the invention are described herein in connection with the following description and the annexed drawings. These embodiments are indicative, however, of but a few of the various ways in which the principles of the invention may be employed and the present invention is intended to include all such aspects and their equivalents. Other advantages, embodiments and novel features of the invention may become apparent from the following description of the invention when considered in conjunction with the drawings. The following description, given by way of example, but not intended to limit the invention solely to the specific embodiments described, may best be understood in conjunction with the accompanying drawings, in which:

FIG. 5 shows an exemplary persistent database according to an embodiment of the present invention.

DETAILED DESCRIPTION

Figure 1:
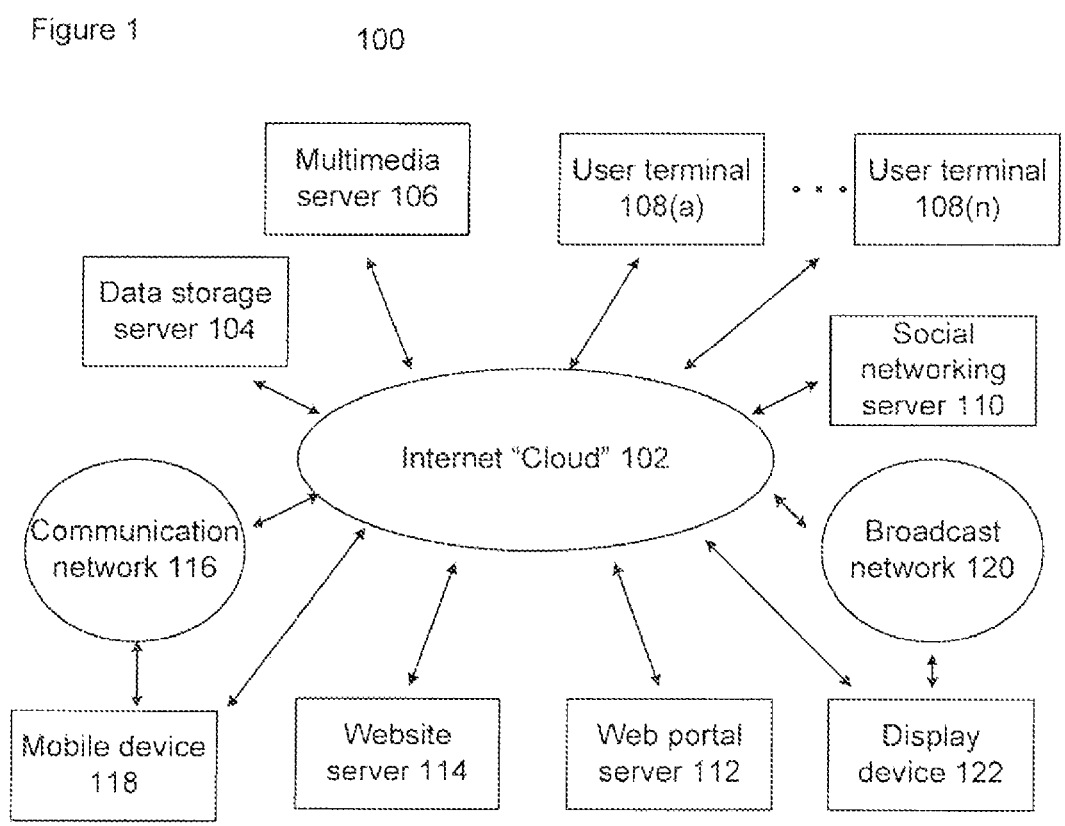
FIG. 1 shows an exemplary network environment that can be used to support embodiments of the present invention.

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the detailed description describes various embodiments of the present invention for illustration purposes and embodiments of the present invention include the methods described and may be implemented using one or more apparatus, such as processing apparatus coupled to electronic media. Embodiments of the present invention may be stored on an electronic media (electronic memory, RAM, ROM, EEPROM) or programmed as computer code (e.g., source code, object code or any suitable programming language) to be executed by one or more processors operating in conjunction with one or more electronic storage media.

Embodiments of the present invention may be implemented using one or more processing devices, or processing modules, or facilities. The processing devices, or modules, or facilities may be coupled such that portions of the processing and/or data manipulation may be performed at one or more processing devices and shared or transmitted between a plurality of processing devices, or modules, or facilities. A module, or unit or facility, as described herein may be a memory unit, or a memory unit operatively couple, either local or remote, to a processor, either dedicated or not-dedicated, such that the module, or unit or facility can either store and/or store and process data.

Indeed, the present invention may be implemented in a distributed or "cloud" computing environment in which shared resources, software and information are provided to computers and other devices over a network, which may be, for example, the Internet. "Cloud computing" typically involves delivering hosted services over the Internet. A cloud service typically has three distinct characteristics that differentiate it from traditional hosting. One characteristic is that it is sold on demand, typically by the minute or the hour; secondly, it is elastic—a user can have as much or as little of a service as they want at any given time; and thirdly, the service is usually fully managed by the provider (the consumer needs nothing but a personal computer and Internet access). Significant innovations in virtualization and distributed computing, as well as improved access to high-speed Internet have accelerated interest in cloud computing. The cloud can be private or public. A public cloud typically sells services to any one on the Internet. (Currently, Amazon Web Services™ is the largest public cloud provider.) A private cloud is a proprietary network or a data center that supplies hosted services to a limited number of people. When a service provider uses public cloud resources to create their private cloud, the result is called a virtual private cloud. Private or public, the goal of cloud computing is to provide easy, scalable access to computing.

"Distributed computing", or "distributed systems" relate to a system of multiple autonomous computers or processing devices or facilities that communicate through a network. The computers interact with each other in order to achieve a particular goal. A computer program that runs in a distributed system is typically referred to as a "distributed program" and "distributed programming" is the process of writing such programs. Distributed computing also refers to the use of distributed systems to solve computational problems. Typically, in distributed computing, a problem is divided into multiple tasks, each of which is solved by one or more computers. In general, distributed computing is any computing that involves multiple computers remote from each other that each has a role in a computation problem or information processing.

A social networking website may represent a persistent and evolving data source. A persistent and evolving data source is a source of data that is continually updated and typically requires a great deal of attention from a user. Persistent and evolving data may include, for example, photographs on a user's social network webpage. The user may choose to update, revise or delete photographs uploaded to their page of the site. The capability and content structure of the social networking website may continue to be updated and improved to be more efficient in term of achieving the social networking function. The content shared on a social networking website may be constantly changing by being added and modified and commented. The method and system of the present invention is capable of managing the distribution of contents among these persistent and evolving data sources.

FIG. 1 illustrates an exemplary network environment 100 according to an embodiment of the present invention.

The exemplary network environment 100 includes at least three networks: a computer network 102 such as Internet, a communication network 116 such as a cellular phone network, and a broadcast network 120 such as provided by commercial providers such as Comcast®. The computer network 102, the communication network 116, and the broadcast network 120 are capable of communication with each other to transmitting data, conversation, and programs among them. The computer network 102 itself may be regarded as "internet cloud." In another embodiment, the computer network 102, the communication network 116, and the broadcast network 120 together may form an "internet cloud."

The computer network 102 is, for example, any combination of linked computers, or processing devices, adapted to transfer and process data. The computer network 102 may be private Internet Protocol (IP) networks, as well as public Computer networks, such as the Internet that can utilize World Wide Web (www) browsing functionality. An example of a wired network is a network that uses communication busses and MODEMS, or DSL lines, or a local area network (LAN) or a wide area network (WAN) to transmit and receive data between terminals. An example of a wireless network is a wireless LAN. Global System for Mobile Communication (GSM) is an example of a wireless network. The GSM network is divided into three major systems which are the switching system, the base station system, and the operation and support system (GSM). Also, IEEE 802.11 (Wi-Fi) is a commonly used wireless network in computer systems, which enables connection to the Internet or other machines that have Wi-Fi functionality. Wi-Fi networks broadcast radio waves that can be picked up by Wi-Fi receivers that are attached to different computers.

The computer network 102 includes a plurality of servers and user terminals that provide a variety of services to users. The plurality of servers and terminals include a data storage server 104 that provides web-based storage spaces, a multimedia server 106 that provides multimedia upload and download to users, a user terminal 108(a) . . . 108(n) that assists a user to obtain services (for the sake of brevity, the user terminal 108(a) . . . 108(n) is hereinafter called "the user terminal 108" unless an individual terminal needs to be distinguished), a social networking sever 110 that provides social networking service to users, a web portal sever 112 that provides website search and listing services, and a website server 114 that provides specialized services.

The data storage server 104 may include any server that provides online storage services, whose providers include Carbonate®, Google®, and Oriocity®. The multimedia server 106 may include any server that allows a user to download or purchase a song, a movie, or Podcast, whose providers include iTune®, Flicky®, and Oriocity®. The user terminal 108 may be a PC, a laptop, a Netbook, or a Tablet PC. The social networking server 110 may include those platforms that provide social networking services, such as YouTube®, FaceBook®, Twitter®, and LinkedIn®. The web portal server 112 may include those that provide a listing service, a category service, and a searching service of websites, such as Yahoo® and Google®. The website server 114 may include those that provide specialized services in one area including news, shopping, or reviews. Examples of those websites include Amazon.com®, cnn.com®, nytimes.com® and etc. It is noted that certain servers may provide more than one service. For example, Oriocity® provides both data storage spaces and multimedia services. In general, a user account is useful when a user is trying to use the service provided by a server.

Each of the servers and computers and terminals may be for example a server computer operatively connected to network 102, via hi-directional communication channel, or interconnector, respectively, which may be for example a serial bus such as IEEE 1394, or other wire or wireless transmission medium. The terms "operatively connected" and "operatively coupled", as used herein, mean that the elements so connected or coupled are adapted to transmit and/or receive data, or otherwise communicate. The transmission, reception or communication is between the particular elements, and may or may not include other intermediary elements. This connection/coupling may or may not involve additional transmission media, or components, and may be within a single module or device or between the remote modules or devices.

The servers and terminals are adapted to transmit data to, and receive data from, each other via the network 102. The servers and terminals typically utilize a network service provider, such as an Internet Service Provider (ISP) or Application Service Provider (ASP) (ISP and ASP are not shown) to access resources of the network 102.

The communication network 116 may include a plurality of mobile communication devices 118 such as cellular phones and personal digital assistant (PDA). The communication network may use a wireless network or a wired network. Global System for Mobile Communication (GSM) is an example of a wireless network. The GSM network is divided into three major systems which are the switching system, the base station system, and the operation and support system (GSM). These mobile devices 118 may access servers of the computer network 102 through the communication network 116 or may communicate with the computer network 102 without the assistance of the communication network 116.

The broadcast network 120 may include a plurality of display devices 122 such as TVs, CRT terminal, and LCD displays. The broadcast network may use a wireless network or a wired network. A satellite system is one example of a wireless network. A cable system is an example of a wired network. The plurality of display devices 122 may also access servers of the computer network 102 through the broadcast network or may access the computer network 102 without the assistance of the broadcast network 120.

A user may participate in a plurality of social networking websites with various objectives. For example, for video and picture sharing, a user may use Flickr® and YouTube®. For general social networking, a user may use FaceBook® or Twitter®. For a professional connection, a user may use LinkedIn®. The user may use a same account for all the social networking sites if the same account is available in each social networking site. The user may also have separate accounts for different social networking websites.

A user may share content between one or more social networking websites. When content is published in a social networking site, a tag, one type of metadata, is assigned to the content. The value of the tag may be set by the social networking site or may be set freely by a user. For example, if a user shares a party picture to a social networking site, the user may set a tag values as "picture, party, best friends, NYC, new." The tag value represents a certain concise description or keywords or attributes of the content. It is an embodiment of the present invention that the tag value may be revised by the owner of a content at any time.

A user may prefer to access the social networking websites from a primary personal computer, a laptop, a tablet a netbook, a cellular phone, or a TV. After the user inputs authentication information, such as user account name and password, the text content or multimedia media content of a social networking website may be obtained and displayed on one of the above-identified electronic devices. In another embodiment, a user may receive a shared content from a social networking website without the need of logging in to an account.

When using an electronic device, a user may want to enjoy online services more than just social networking. The user may also want to go to Amazon.com® for shopping or go to CNN.com® for reading news. The user may also want to back up or share contents from the primary personal computer or other devices to an online server. The user may also want to publish contents directly to another device such as a TV or a phone of a friend. For example, the user may want to publish a personal picture on Flickr®, share it with a friend on Facebook®, view it on a TV, and transmit it to the cellular phone of a family member.

Figure 2:
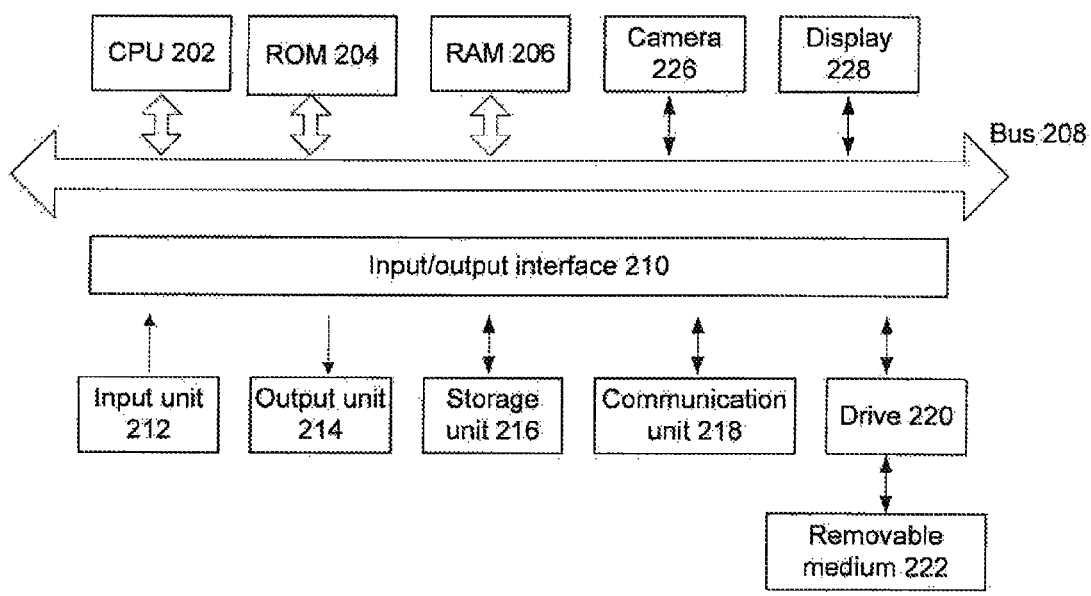
FIG. 2 shows an exemplary user device according to an embodiment of the present invention.

FIG. 2 illustrates an exemplary user device 200 according to an embodiment of the present invention. The exemplary user device 200 may be a primary personal computer, a laptop, a tablet, a netbook, a cellular phone, or a TV or other suitable device.

The exemplary user device 200 includes a CPU 202, a ROM 204, a RAM 206, a bus 208, an input/output interface 210, an input unit 212, an output unit 214, a storage unit 216, a communication unit 218, a drive 220, a removable medium 222, a camera 226, and a display 228. The CPU 202, the ROM 204, and the RAM 206 are interconnected to one another via the bus 208, and the input/output interface 210 is also connected to the bus 208. In addition to the bus 208, the input unit 212, the output unit 214, the storage unit 216, the communication unit 218, and the drive 220 are connected to the input/output interface 210. The CPU 202 executes various kinds of processing in accordance with a program stored in the ROM 204 or in accordance with a program loaded into the RAM 206 from the storage unit 216 via the input/output interface 210 and the bus 208. The ROM 204 has stored therein a program to be executed by the CPU 202. The RAM 206 stores as appropriate a program to be executed by the CPU 202, and data necessary for the CPU 202 to execute various kinds of processing. The input unit 212 includes a keyboard, a mouse, a microphone, and the like. When the input unit 212 is operated by the user, the input unit 212 supplies an input signal based on the operation to the CPU 202 via the input/output interface 210 and the bus 208. The output unit 214 includes a display, such as a CRT (Cathode Ray Tube) or an LCD, a speaker, and the like. The storage unit 216 includes a hard disk, a flash memory, and the like, and stores a program executed by the CPU 202, data transmitted to the terminal 200 via a network, and the like. A removable medium 222 may be, for example a magnetic disk, an optical disc, a magneto-optical disc, or a semiconductor memory, which may be loaded as appropriate into the drive 220. The drive 220 reads data recorded on the removable medium 222 or records predetermined data on the removable medium 222. The camera 226 may take a still picture or a motion picture and store the taken picture to the user device. The display 228 may be part of the output unit 214 or may be a second display unit. The communication unit 21.8 includes a modem, a terminal adaptor, and other communication interfaces, and performs a communication process via the networks of FIG. 1.

A user may store a plurality of contents on the user devices or may store contents in the "internet cloud," which allows a user to access the content anywhere as long as the network access is available. The user may choose to share the content stored in the user device or share the content stored in the "internet cloud." When the method and system of the present invention is implemented as software, the software may be installed in the user device. In another embodiment, the software may be provided by a server connected with the user device via a network (wired or wireless), which allows the user to user to execute the software through a web browser.

Figure 3:
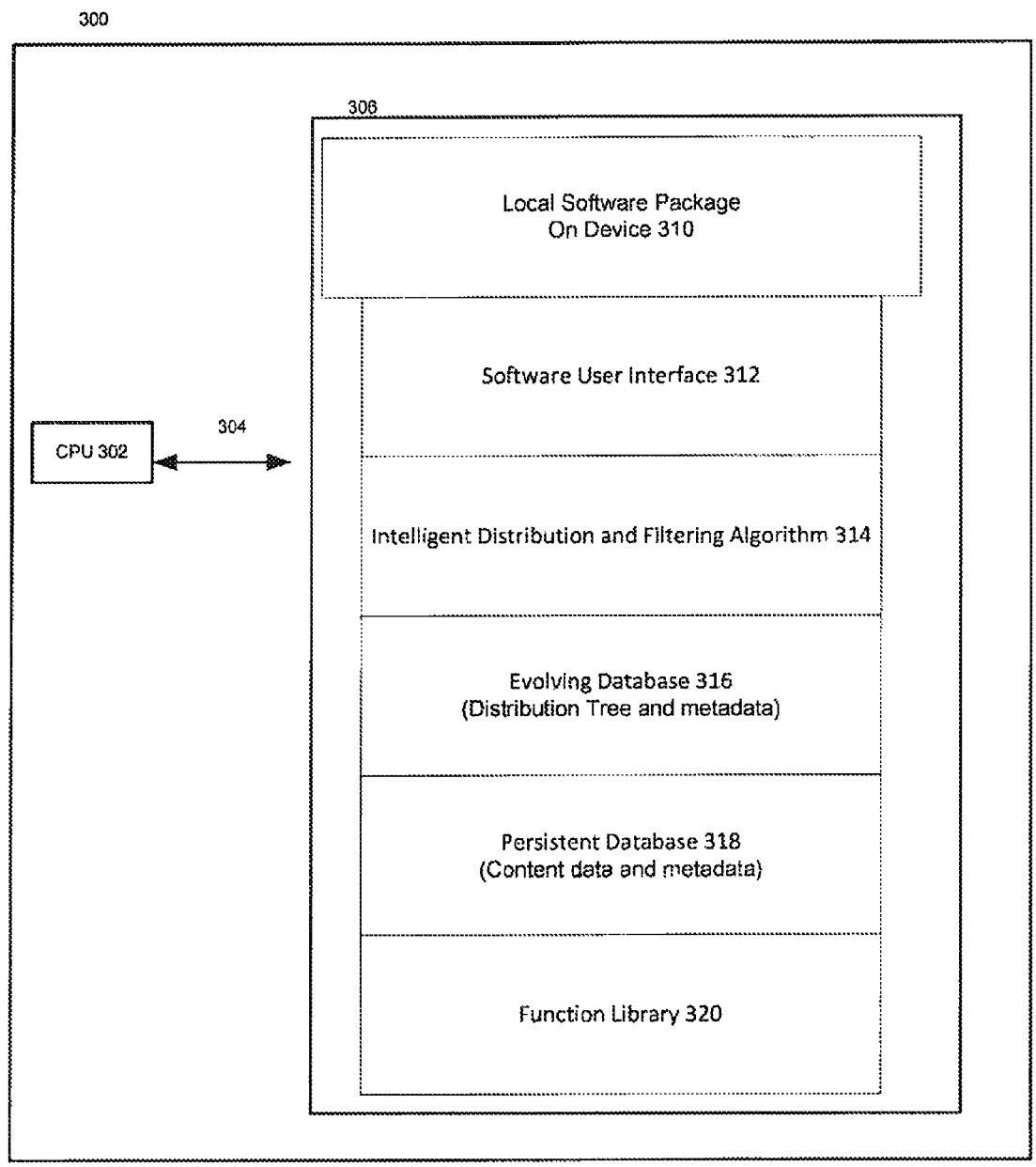
FIG. 3 shows an exemplary processing module according to an embodiment of the present invention.

FIG. 3 illustrates exemplary processing modules of the user device according to an embodiment of the present invention.

The user device 300 includes a CPU 302 that executes instructions included in an installed set of software programs 306. These instructions and computing results of the CPU 302 are exchanged between the software programs 306 and the CPU 302 through a data pathway 304. The set of software programs 306 includes a local software package 310 designed in accordance with the method and system set forth in the present disclosure. The local software package 310 includes a user interface module 312, a distribution and filtering module 314, an evolving database 316, a persistent database 318, and a function library 320. The user interface module 312 provides a user interface, which receives instructions from the user, instructs CPU 302 to execute predetermined processing, and presents contents to the user in accordance with the instructions.

The distribution and filtering module 314 implements various distribution and filtering algorithms to the local contents and the received contents. For example, the distribution and filtering algorithm may examine metadata of a local content to determine whether it is a new content, a content that has never been shared, or a content falling into an interest of the user. The distribution and filtering algorithms may also determine whether content received from another source such as a social networking platform is an article, a video, a picture, an email, or a linking request. More functions of the distribution and filtering algorithms will be disclosed in detail in the following sections of the present disclosure.

The evolving database 316 includes a distribution tree and metadata in order to organize network node information. The evolving database 316 maintains a plurality of databases, each of which is designed for a designated social networking platform. For example, a user may participate in both FaceBook® and Twitter®. The evolving database 316 may include two databases: one for FaceBook® and the other for Twitter®. The evolving database 316 also tracks functions of each social platform and updates the database fields according to changes made to a social platform. The evolving database 316 may also expand or delete a database depending on a user's participation in social platforms. The evolving database 316 may also include a plurality of databases, each of which is designed for a plurality of similar social networking platforms. More functions of the evolving database 316 will be disclosed in detail in the following sections of the present disclosure.

The persistent database 318 includes content data and associated metadata. The persistent database 318 has a record for each segment of content, or content. The metadata may include receiving information of content, distribution information of the content, tag value, and other attributes of the content. More functions of the persistent database 318 will be disclosed in detail in the following sections of the present disclosure.

The functional library 320 includes a table that tracks functions of all sites and associate the functions with content metadata and user preferences. When a user selects content, the CPU 302 may search the function library to identify functions available to that content, such as emailing, publishing to a social networking platform, and sharing with other users.

Figure 4:
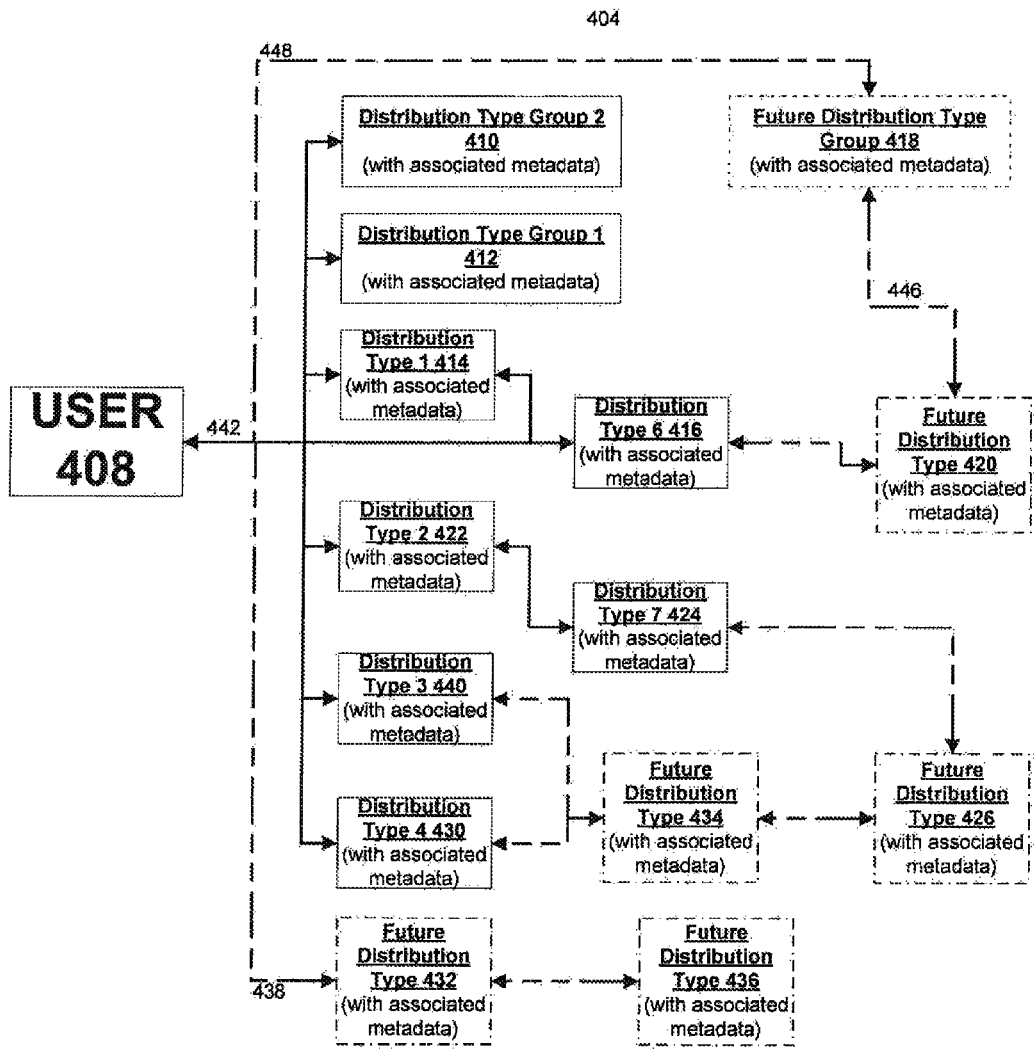
FIG. 4 shows an exemplary evolving database according to an embodiment of the present invention.

FIG. 4 illustrates a distribution tree and associated metadata 400 of the evolving database according to an embodiment.

The evolving database 404 includes a social networking map of distribution types which is ever growing and ever increasing in complexity of the metadata linked to each distribution type or group of distribution types. Distribution type may be represented a personal contact location (e-mail and IM), a device (TV, digital frame, PC, smart device), or social networking location. Each time a piece of content is delivered, metadata about the content, contacts, and distribution method is recoded for the distribution type. This includes source, destination, delivery method, associations to other distribution types. Further automated distribution decisions can be made based on the evolving data. The database also maintains a list of distribution type connections similar to the branches of a tree. New branches may be added and lined. Distribution type groups may be maintained for frequently used groups of distribution types.

For example, distribution type 1, 414, may be a distribution to "YouTube®," and the associated metadata may be "Video." The distribution type 1, 414, may include the address information of a site and content requirement information of that site. Distribution type group 1, 410, may include a plurality of sites. For example, if content is a picture, distribution type group 1, 410, may include "FaceBook®" and "MySpace®," so that if the distribution type group 1, 410, is selected, the picture may be published to both sites. The associated metadata includes metadata information about the content and the site. The decision tree is updated each time a new social networking site is available or each time content is shared or published. It is noted that the distribution type or distribution type group may also be a list of contacts or a list of devices, which the user may want to share the content with. Future distribution type 420 or future distribution type group 418 may be built based on other distribution type or distribution type groups. For example, if a user selects a distribution type or distribution type group and modifies it, the evolving database 404 adds a new entry in the tree and makes a link between the new entry with associated old entries.

According to some embodiments, to make the evolving database 404 more manageable, the evolving distribution methods, shown as 410-412 and 416-440, are kept unique according to content type, location, privacy settings, methods (share, publish, or transmit), address of receiving platform, etc. In this way, distribution type group 410 is different from distribution type 412. A logic mechanism is used in the distribution algorithm to prevent the user from having identical distribution methods.

FIG. 5 illustrates an exemplary persistent database structure 500 according to an embodiment of the present invention.

The persistent database includes a list of all the content (504) the user has distributed with the content metadata (506) and distribution history (510). Metadata 506 includes tags, labels, categories, etc. Distribution history date and contact 510 include distribution method, the data, and the contacts sent to. When a user selects content, the persistent database is searched. If the content is included in the persistent database, the associated record of the content is read out to determine the metadata and distribution history of the content. Based on the metadata and distribution history of the content, an introductory message may be presented to the user to show the publication or sharing information of the content in the past. If the persistent database does not include the content, the persistent database creates a new record for the content and also suggests to the user that the content has not been published. Whenever content is published or shared or processed according to a user's input, the persistent database obtains the processing information of the content and extracts the metadata and distribution information and updates the record to reflect the new processing. For example, the processing information is added to the metadata field and distribution history field.

The persistent database 502 may organize the content in an alphabetic order or organize the content in a chronological order or organize the content based on content type. The persistent database 502 may also add content regardless whether that content is selected by the user or not. For example, if a user selects only one picture in a folder that includes a plurality of pictures, the persistent database 502 may not only add the selected content into the database, but also add the rest, or additional pictures to the persistent dataset. Such a pre-processing may reduce a processing time of content when that content is selected for the first time. The persistent database 502 may not allow duplicate contents in the database in order to make the database manageable. The persistent database 502 may determine duplicate contents based on content type, date, creator, title, and other metadata of the content. For example, if a content is a video, the persistent database 502 determines whether it duplicates a content already recorded in the database based on title, duration, cast name, creation date, author, and resolution. If the content is a picture, the persistent database 502 may make the determination based on creation date, author, size, resolution or any faces or objects identified in the picture. If the content is a text based documents, the persistent database may make the determination based on creation date, author, size, or a hash value of that document.

It is noted that the persistent database 502 may include information other than metadata and distribution history data and contact. For example, the persistent database 502 may also include information about age of content, formats, and owner information of the content.

Figure 6:
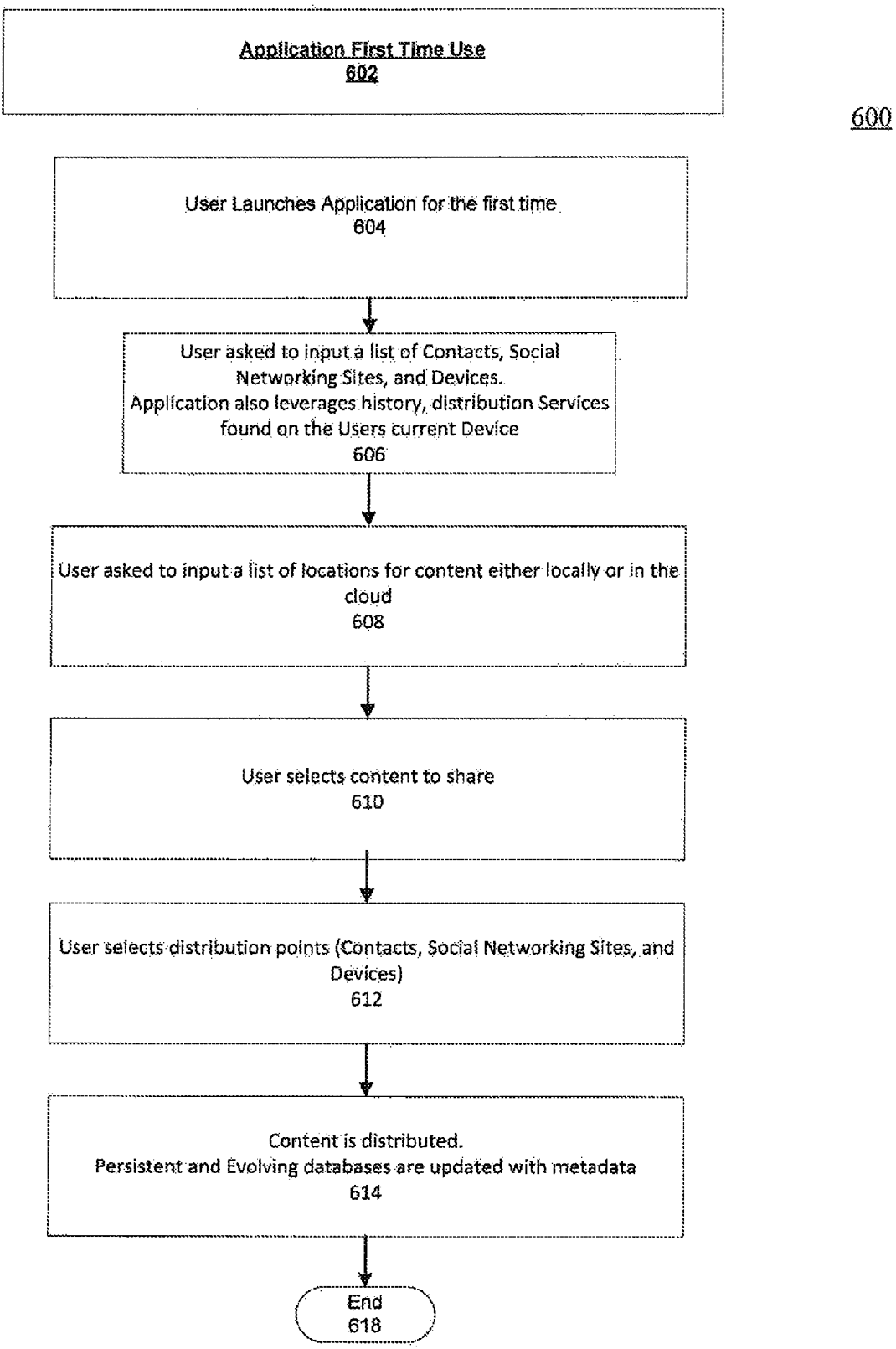
FIG. 6 shows exemplary processing steps that may be executed when a user uses the method according to an embodiment of the present invention.

FIG. 6 illustrates exemplary processes 600 when a user executes the software package (e.g., as shown in FIG. 3 as element 310) for the first time according to an embodiment of the present invention.

At step 604, a user launches the application for the first time. After the application is launched, the application searches for pre-registered information, such as user name, user account, or authentication information. As it is the first time usage, no such information is found. Then, at step 606, the application asks the user to register. For example, the user may set up a user name or user account and associate the user or user account with a list of contacts, social networking sites, and devices. The application may also leverage history, distribution services found on the user's current device. For example, the application may search the history of browsers to obtain information about social networking sites that the computer has accessed. The application may also search for a sharing folder or a download folder or a picture folder or video folder in the local device, which may be a preferable folder that the use uses for sharing service. At step 608, the user is asked to input or identify a list of locations for content either stored locally or in the cloud. The application may give a list of searched folders of the local device or may also give a list of "cloud addresses" that are commonly available to a user. After the user finishes the input of local locations and cloud locations for the application, the application may not search for additional locations and accept the selections of the user. At step 610, the application tracks the operation of the user. For example, when the user selects content, or a portion of content, the application obtains metadata of the content and recommends possible operations to the content based on the metadata, history of the content, user's account information, or user's preferences. The recommendations may include suggestions to transmitting the content to a plurality of devices, emailing the content to a plurality of contacts, publishing the content to a plurality of social networking platforms, or storing the content in a local location or a cloud location. At step 612, the application keeps monitoring user's selections. The user may follow the recommendations or may manually request a new service, such as sharing the content to a new social networking site. For example, the user may select a sharing option and select one or more points to share the content, including contacts, social networking sites, or devices. Based on the user's selection, the application prepares the content for the operation. The application may reformat the content in accordance with the requirement of a social networking site, the requirement of a device, or the requirement of a cloud server.

At step 614, the content is distributed according to the user's selection. The evolving database and the persistent database are updated to record the operation of the content, the metadata of the content, newly added metadata by the user or the application, or distribution information of the content. At step 618, the process for the first time usage ends.

The metadata, which may be added by the application, may include additional inferred information of the content. For example, when the content is a file, the application may extract information about all the persons who review the content, modify the content, or distribute the content. When the content is a picture, the application may identify the name of the person in the picture, the location of the picture, and the date of the picture. The above-list of exemplary metadata does not mean to be exhaustive, but only serves as examples.

Figure 7:
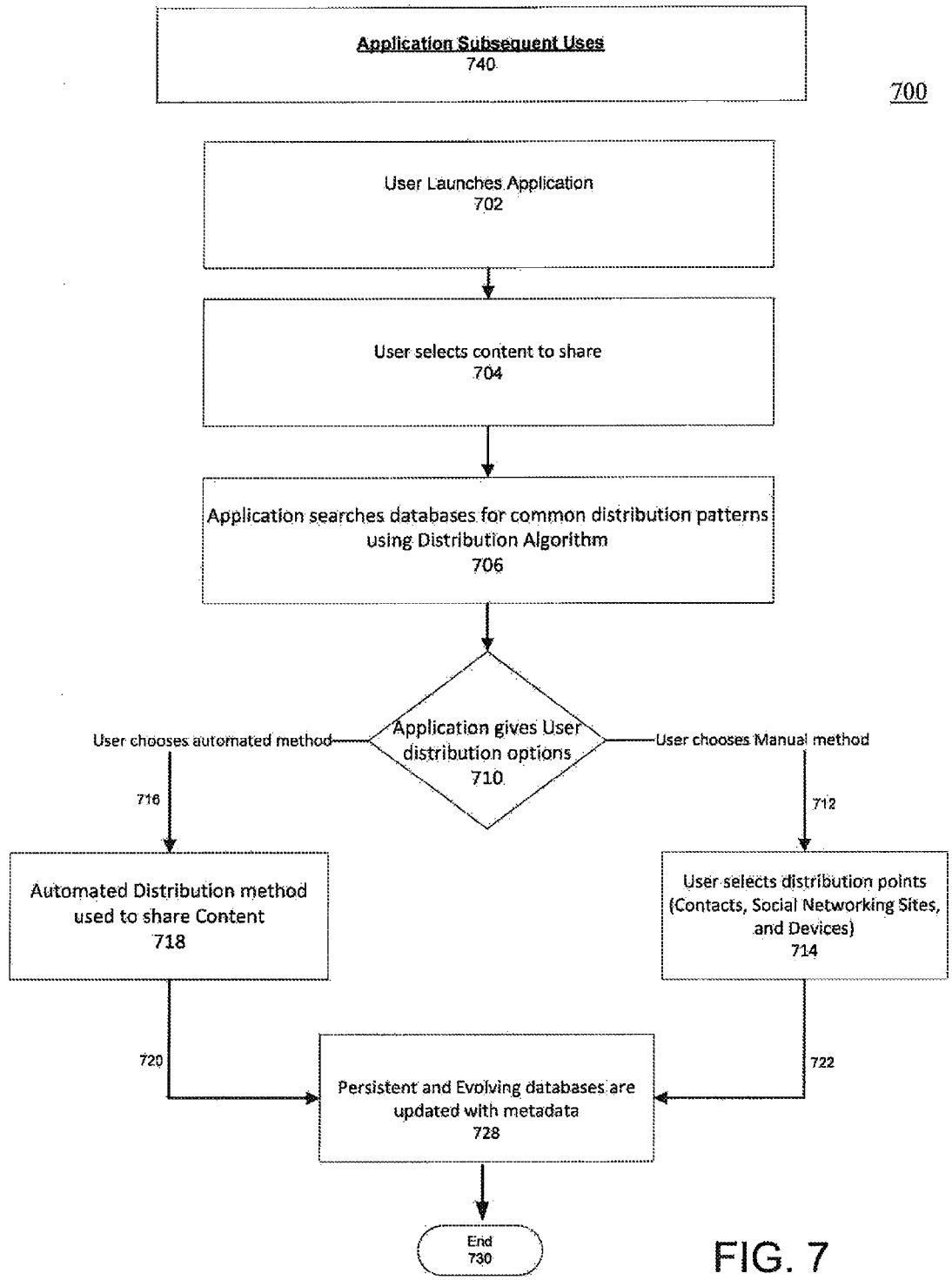
FIG. 7 shows exemplary processing steps that may be used when a user uses the method according to another embodiment of the present invention.

FIG. 7 illustrates processes 700 for a subsequent use according to an embodiment.

At step 702, the application is launched. The application obtains user's account information and authentication information such as storage location of content. At step 702, the application automatically aggregates contents from locations that are included in the account information. The application may access each social networking site and download newly updated contents such as tweets, comments, pictures, or befriending requests associated with that user. The application may also search each storage location either local or in "cloud" to find contents that are newly added or modified. After aggregation, the local device has obtained all contents that may be of interests to the user and is ready to present to the user upon instructions. At step 704, the application presents predetermined aggregated contents to the user and monitors the operation of the user. The user may select a content to share.

At step 706, the application searches databases for common distribution patterns using distribution algorithm. The application obtains the content metadata and adds new metadata as discussed before. The distribution algorithm selects one or more distribution type from the decision tree, as shown in FIG. 4 for this content. At step 710, the application gives the user a list of recommendations or options. If the user selects an automated method, the process goes to step 718, as shown by line 716, which automatically distributes or share the content based on a predetermined method. If the user selects a manual method, the process goes to step 714, as shown by line 712, in which the application allows the user to manually select the distribution points.

At step 728, both the evolving database and the persistent database are updated with metadata. End step 730 is also shown.

Figure 8:
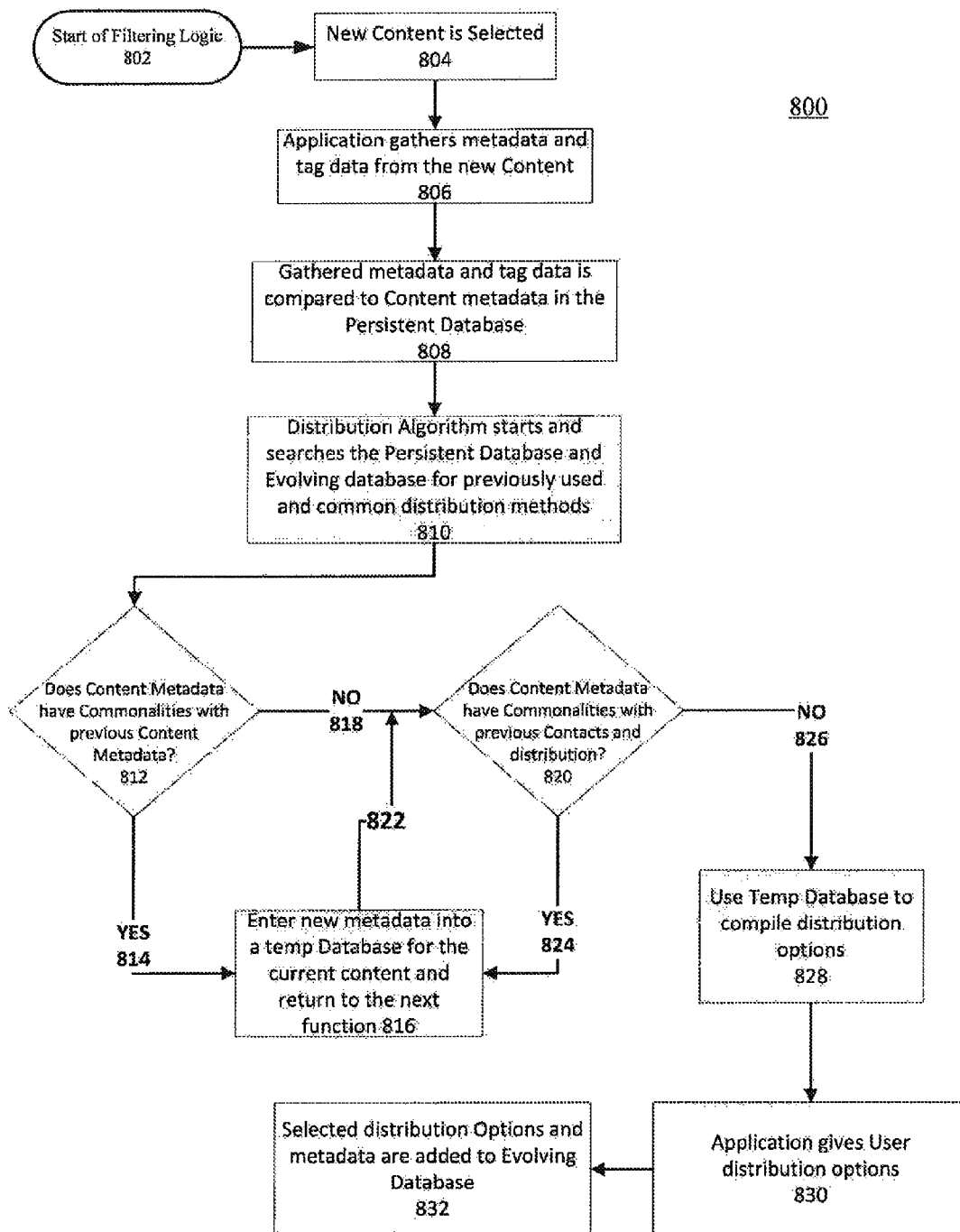
FIG. 8 shows exemplary filtering processing steps according to an embodiment of the present invention.

FIG. 8 illustrates exemplary processes 800 for selecting recommendations or options to a user according to an embodiment.

At step 802, the distribution and filtering algorithm is activated whenever the application is launched. At step 804, a new content is selected. At step 806, the application gathers metadata and tag data from the new content. At step 808, gathered metadata and data are compared with content metadata in the persistent database. At step 810, a distribution algorithm starts and searches the persistent database and evolving database for previously used and common distribution methods. At step 812, the application determines whether content metadata have commonalities with previous content metadata.

If the content metadata has commonalities with previous content metadata, the process goes to step 814 and step 816, which enters new metadata into a temp database for the current content and returns to the next function. If the content metadata has no commonalities with previous content metadata, the process goes to step 818 and step 820, which determines whether metadata have commonalities with previous contacts and distribution. If the content metadata has commonalities with previous contacts and distribution, the process goes to step 824 and step 816. If the content metadata has no commonalities with previous contacts and distribution, the process goes to step 826 and step 828, which uses temp database to compile distribution options.

At step 830, the application gives user distribution options. At step 832, the application distributes content based on the selected distribution options and adds metadata to the evolving database and persistent database.

Figure 9:
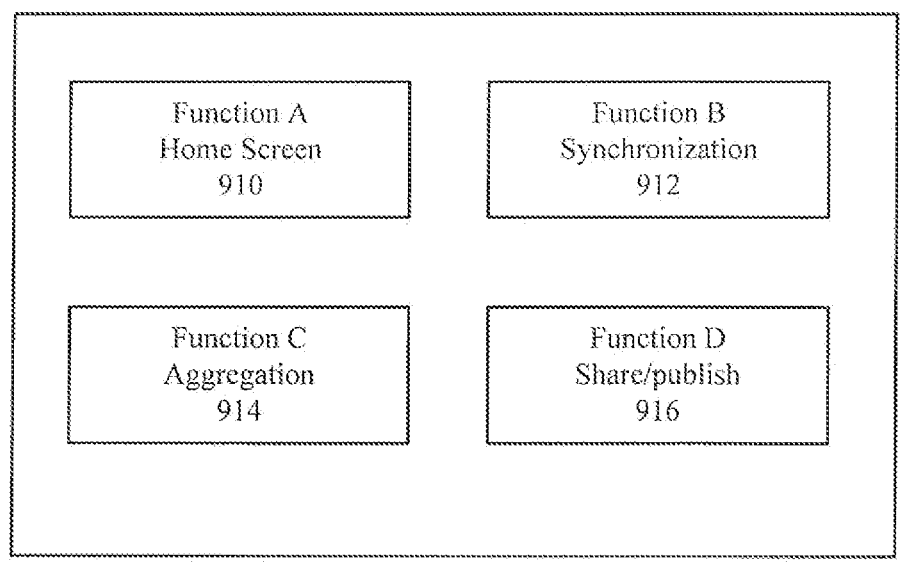
FIG. 9 shows an exemplary home screen according to an embodiment of the present invention.

According to an embodiment of the present disclosure, the method and system further provides a graphical user interface assisting a user to conveniently manage data from multiple sources. FIG. 9 illustrates exemplary functions implemented by the method according to an embodiment of the present invention.

The method 900 according to an embodiment includes at least four functional operations. Home screen module 910 is designed to provide the user a home screen that assists the user to digest information obtained and aggregated from multiple sources including multimedia servers, social networking servers, email servers, and individual websites. Synchronization module 912 is designed to allow a user to synchronize data with multiple sources such as a primary PC preferred by the user, a camcorder, a camera, a cellular phone, and an online storage space. Aggregate module 914 is designed to obtain and aggregate information, such as media, communication, and news from multiple sources. Share/publish module 916 is designed to allow the user to share or publish media and news with other devices or accounts. Each of the above-identified four functions is explained in detail in the following descriptions and drawings. The functions shown in FIG. 9 also allow a user to add additional functions to the home screen or to remove some functions to the home screen.

Figure 10:
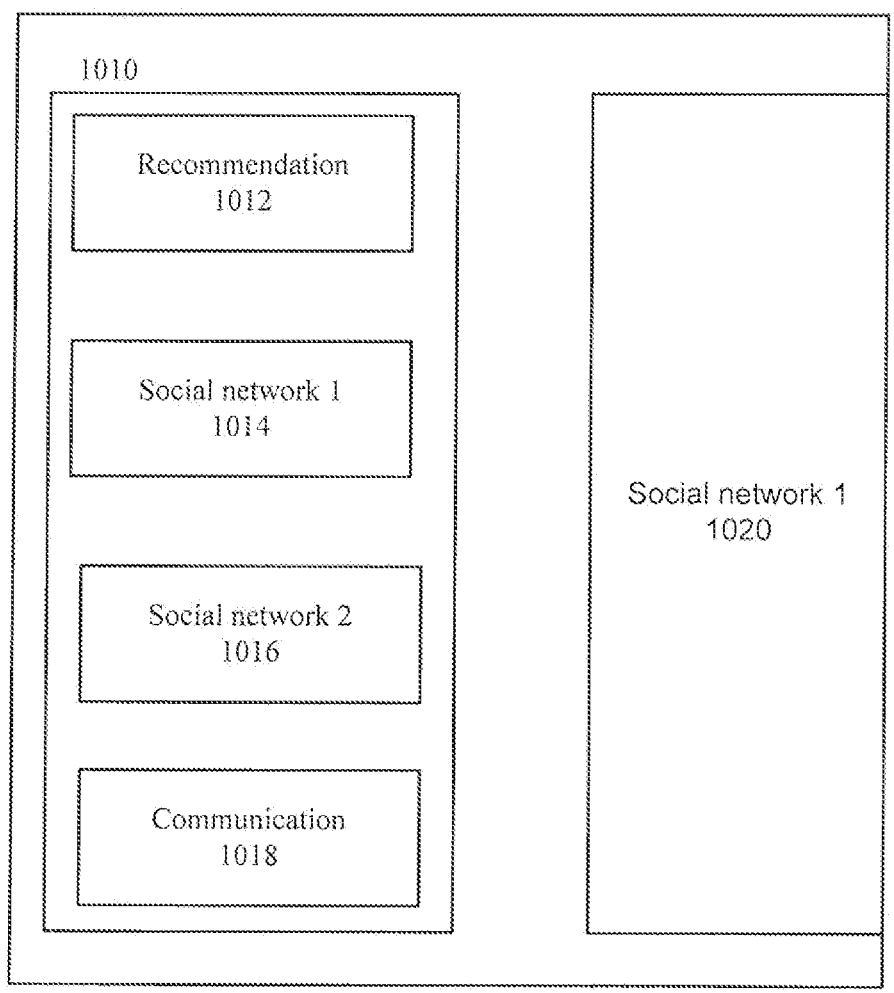
FIG. 10 shows an exemplary home screen according to an embodiment of the present invention.

FIG. 10 illustrates an exemplary home screen 1000 generated by home screen module 910, as shown in FIG. 9.

The home screen 1000 includes a central console page 1010 and an individual page 1020. The central console page 1010 displays news and information aggregated from multiple sources. The central console page 1010 includes a recommendation section 1012, a section 1014 for a first social networking server, a section 1016 for a second social networking sever, and a communication section 1018 that displays incoming and outgoing emails. The individual page 1020 displays news and information of a single social networking website. For example, if a user selects a first social networking server such as Twitter®, the individual page 1020 displays news and information of Twitter®. One of the social networking section 1014 and 1016 may be used to display information of a non-social networking website such as CNN.com®. The contents displayed in each section 1012, 1014, 1016, 1018, 1020 may be updated periodically, such as every 30 seconds or five minutes or half an hour, or updated anytime upon a request by the user.

Figure 11:
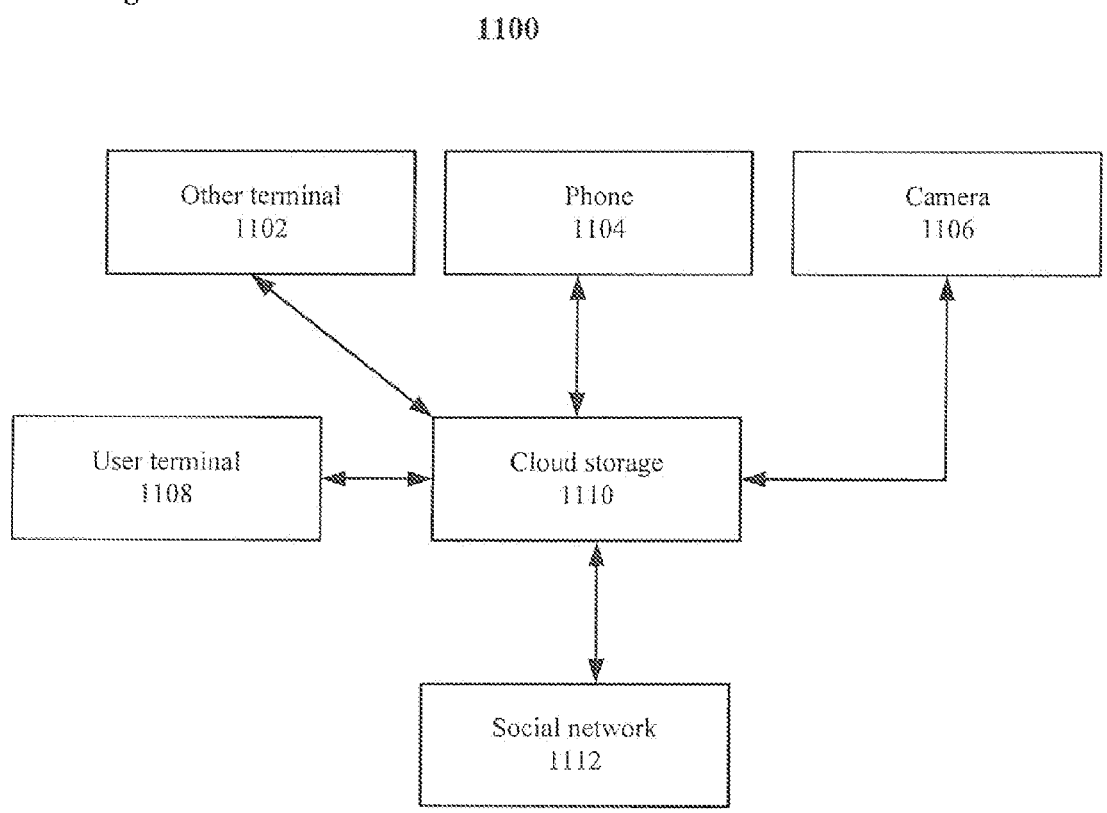
FIG. 11 shows an exemplary aggregation process according to an embodiment of the present invention.

FIG. 11 illustrates an exemplary method 1100 for synchronization of data stored on multiple sources. The method is shown by modules, or functional blocks.

The synchronization function (shown in FIG. 9 as element 912) accesses a web storage or a cloud storage 1110, which connects with the user terminal 1108 or a primary PC, another terminal 1102, a mobile phone 1104, a camera 1106, and a social networking sever 1112. The web storage or the cloud storage 1110 allows a user to store data or media from the phone 1104, the camera 1106, the primary PC 1108, or even another terminal 1102.

Once content is stored on the cloud storage 1110, a user may accesses the cloud storage 1110 from any where as long as web connection allows. The user may share or publish stored content to the social networking server 1112. The method provides the user with a browser based application and online office document applications so that the user may view edit, save and share files stored on the cloud storage 1110.

Figure 12:
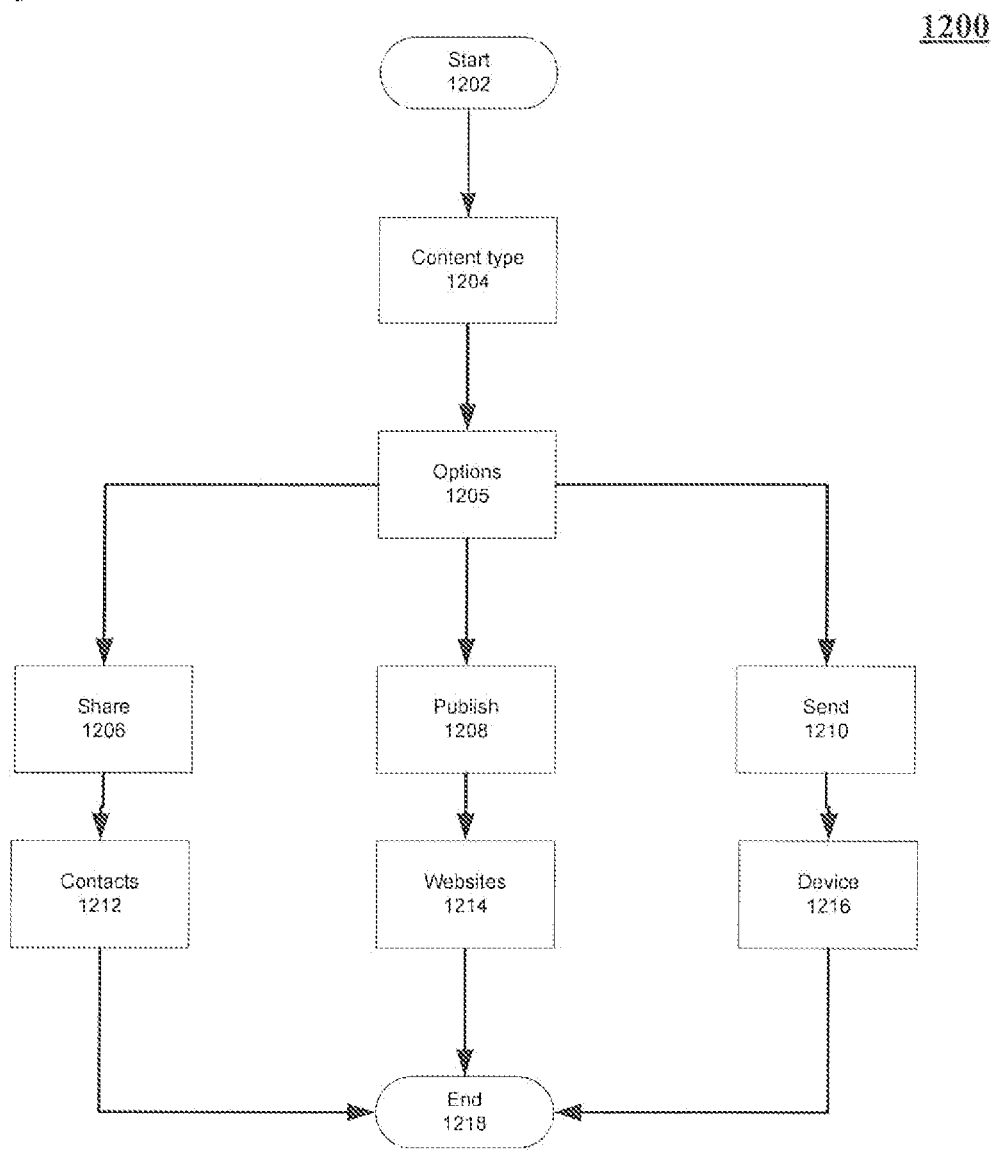
FIG. 12 shows an exemplary sharing and publishing process according to an embodiment of the present invention.

FIG. 12 illustrates a method 1200 for publishing or sharing a media according to an embodiment.

The method 1200 starts at step 1202 when the user digests content displayed on the central console page or an individual page (shown in FIG. 10 as element 1010). A user may move a mouse cursor, track ball, or other input mechanism or means, from one displayed content to another displayed content. The displayed content may be one obtained from a social networking website or may be one stored in a cloud storage or one stored on a local computer. At step 1204, when the user moves a mouse cursor to particular content, the method determines the media type of the object, such as whether it is a video, audio, text, or news.

At step 1205, the method provides the user at least three options: a sharing option, a publishing option, and a sending option by displaying, for example, a mail icon, a human icon, and a device icon, for example. Other icons for other functions may also be displayed, but for purposes of discussion, the sharing, publishing and sending options will be described herein.

The mail icon, shown in FIG. 12 as "share" step 1206 indicates that the content may be sent to a plurality of contacts if the user selects the sharing option. The human icon indicates that the content may be published to a social networking website if the user selects the publishing option (1208). The device icon indicates that the content may be sent to a device such as a TV or a computer if the user selects the device icon (1210). If a user selects a sharing option, a publishing option, or a send option, the method goes to step 1206, 1208, or 1210 respectively.

At step 1206, the method determines that the user selects a sharing option. At step 1212, the method obtains a list of contacts from the user's address book and displays the list of contacts to the user. Upon a selection of the contacts, the method sends out the content according to the address of a selected contact and then goes to step 1218.

At step 1208, the method determines that the user selects a publishing option. At step 1214, the method determines whether a publication of the content type of step 1204 is allowed by each social networking websites. For example, FaceBook®, YouTube®, and MySpace® allow video sharing. But, Twitter® does not. The method displays all the social networking websites that allow a publication such content.

When the user selects a social networking website, the method publishes the content to that particular social networking website and goes to end step 1218.

At step 1210, the method determines that the user selects a sending option. At step 1216, the method obtains a list of devices, which have been identified by the user in advance. Each of these devices has a unique name and/or identifier that helps the user to know the location or usage of the device. For example, the list of devices may include "My TV", "Grandpa TV", "My Photo Frame", and "Her Cell Phone". Each of the devices has a unique address such as an IP address or a phone number associated with the device or storage location, from which the content may be retrieved or accessed. If a user selects a device, the method transmits the content to that device and goes to end step 1218.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A method of managing contents related to a plurality of social networking websites, comprising:
   accessing a first account that stores user's authentication information of the plurality of social networking websites;
   connecting a server processor to the plurality of social networking websites by using the authentication information of the plurality of social networking websites;
   obtaining obtained contents associated with a second account, as identified by the authentic ion information, from each of the plurality of social networking websites;
   tracking service capabilities for receiving a type of content of each of the plurality of social networking websites;
   displaying the obtained contents associated with the second account from the plurality of social networking websites on a single page;
   providing service information applicable to content according to the type of content and the service capabilities of each of the plurality of social networking websites;
   receiving other stored content for distribution to the plurality of social networking websites;
   distributing the received other stored content to each of the plurality of social networking websites based on the tracked service capabilities for receiving content, and
   updating the service capabilities for receiving content of each of the plurality of social networking websites.

2. The method according claim 1, wherein the first account further stores authentication information of a multimedia server, the method further including:
   wherein the obtained contents are from the multimedia server; and
   displaying the obtained contents from the multimedia server together with the contents from the plurality of social networking websites on a same page.

3. The method according to claim 1, further comprising:
   aggregating the obtained contents from plurality of the social networking websites; and
   storing the aggregated obtained contents in a web storage.

4. The method according to claim 3, further comprising:
   accessing other stored content stored in a predetermined folder of a local computer; and
   synchronizing the other stored content stored in the predetermined folder of the local computer and that stored in the web storage.

5. The method according to claim 1, further comprising:
   sharing the obtained contents and other stored content among the plurality of social networking websites.

6. The method according to claim 1, further comprising:
   receiving updates of the obtained contents from the plurality of social networking websites; and collectively displaying the updates on the same page that displays the obtained contents obtained from the plurality of social networking websites.

7. The method according to claim 1, further comprising:
   distributing the obtained contents to a plurality of devices associated with a plurality of contacts aggregated from the obtained contents from the plurality of social networking websites.

8. The method of claim 1, further comprising:
   identifying additional content;
   determining parameters of the additional content;
   wherein the displaying step displays the additional content as a function of the parameters of the additional content.

9. The method of claim 1, further comprising:
   establishing filtering parameters associated with the service capabilities of each of the plurality of social networking websites;
   filtering the obtained contents using the filtering parameters.

10. The method of claim 1, further comprising:
    establishing one or more tags based on predetermined criteria;
    applying one or more tags to the obtained contents;
    filtering the obtained contents based on the one or more tags; and
    distributing the filtered obtained contents to one or more destinations.

11. The method as claimed in claim 1, further comprising:
    identifying format parameters with a destination website;
    formatting the obtained contents and the other stored content based on the format parameters; and
    transmitting the formatted obtained contents and the other stored content to the destination website.

12. The method of claim 1, wherein the obtained contents and the other stored content are selected from the group consisting of: audio data; video data; photographic data; or image data.

13. The method of claim 1, further comprising:
applying one or more facial recognition techniques to a particular content; and
tagging the particular content based on the application of the one or more facial recognition techniques.

14. The method of claim 1, further comprising:
identifying content specific information related to particular content in the obtained contents and the other stored content;
accumulating the content specific information; and
sorting the obtained contents and other stored content based on the accumulated content specific information.

15. The method of claim 1, further comprising:
establishing one or more categories based on predetermined criteria; and
associating particular content selected from the obtained contents and other stored content with one or more categories; and
displaying categories associated with particular content.

16. The method of claim 1, further comprising:
associating one or more labels with each content selected from the obtained contents and the other stored content;
selecting a particular content having a particular label; and
distributing the selected particular content based on the particular label.

17. The method of claim 1, further comprising:
establishing a desired format for a recipient to receive selected content; and
providing the selected content to the recipient in the desired format for the recipient.

18. The method of claim 1, further comprising:
establishing one or more first tags based on predetermined criteria;
applying one or more first tags to the obtained contents and the other stored content;
filtering the obtained contents and the other stored content based on the one or more first tags;
establishing one or more second tags based on additional criteria;
re-tagging the obtained contents and the other stored content based on the one or more second tags;
filtering the obtained contents and the other stored content based on the one or more second tags; and
distributing the filtered obtained contents and other stored content to one or more destinations.

19. The method of claim 18, further comprising:
changing either one or more of the first tags or one or more of the second tags associated with the obtained contents and other stored content; and filtering the obtained contents and the other stored content based on the changed tags.

* * * * *